Aug. 23, 1927.
J. W. CRUIKSHANK
METHOD FOR GRADING AND DELIVERING SAND TO
GLASS GRINDING MACHINES
Original Filed May 5, 1922   4 Sheets-Sheet 1

INVENTOR
James W. Cruikshank.

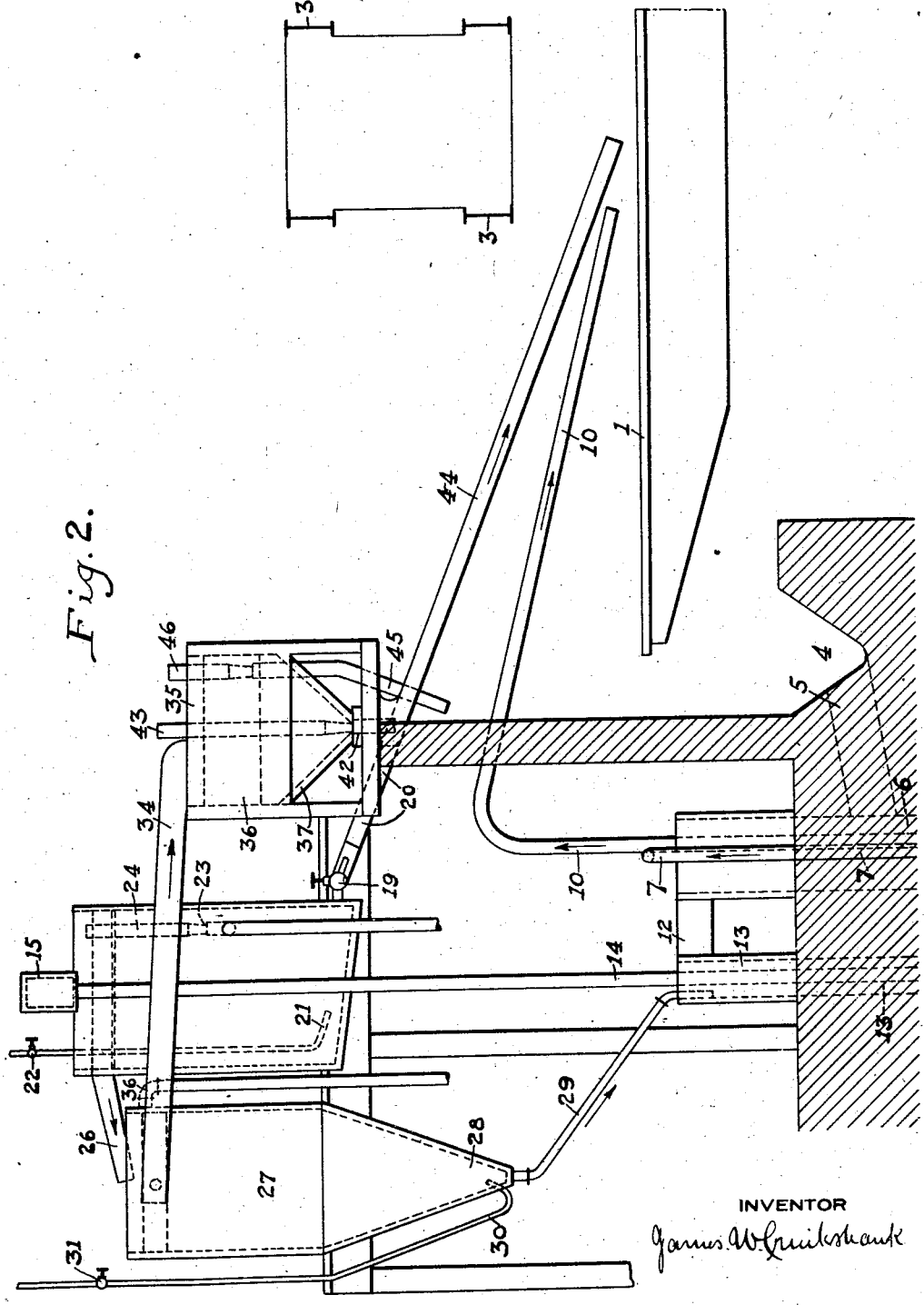

Aug. 23, 1927.  1,640,029
J. W. CRUIKSHANK
METHOD FOR GRADING AND DELIVERING SAND TO
GLASS GRINDING MACHINES
Original Filed May 5, 1922   4 Sheets-Sheet 3
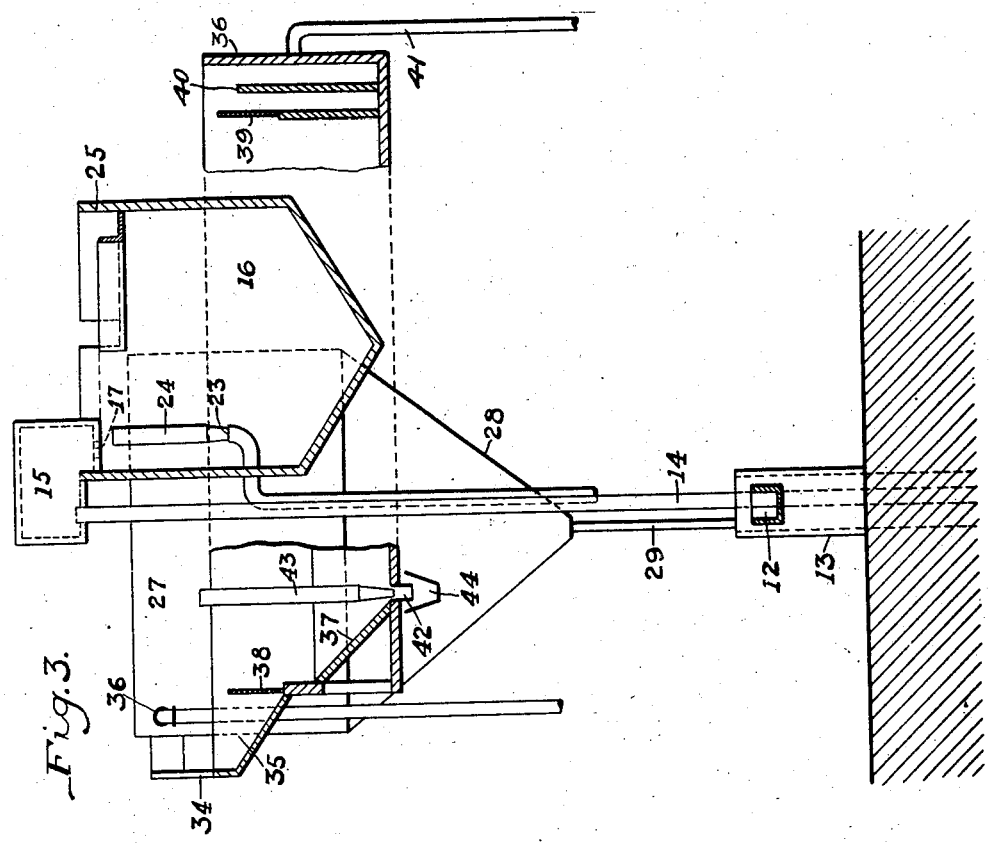
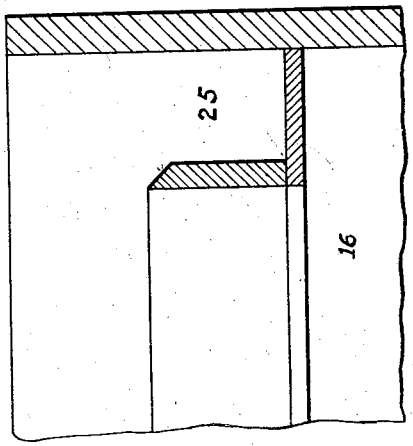
INVENTOR
James W. Cruikshank.

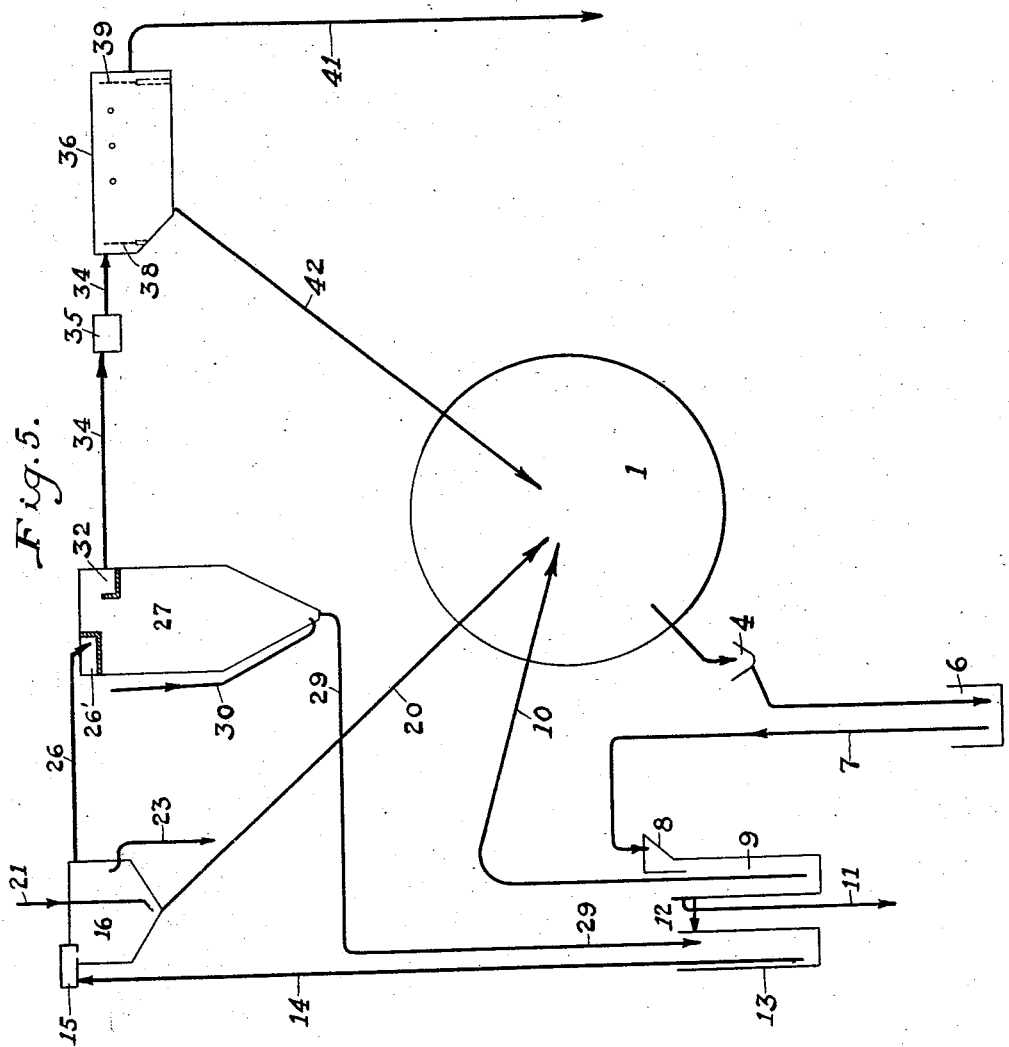

Patented Aug. 23, 1927.

1,640,029

UNITED STATES PATENT OFFICE.

JAMES W. CRUIKSHANK, OF PITTSBURGH, PENNSYLVANIA, ASSIGNOR TO J. W. CRUIKSHANK ENGINEERING COMPANY, OF PITTSBURGH, PENNSYLVANIA.

METHOD FOR GRADING AND DELIVERING SAND TO GLASS-GRINDING MACHINES.

Original application filed May 5, 1922, Serial No. 558,743. Divided and this application filed October 19, 1926. Serial No. 142,628.

This invention is a division of my application Serial No. 558,743 relating to sand grading more particularly to the art of grinding and polishing plate glass, and method for supplying the graded abrasive material to the grinding apparatus.

Another object of the invention is to provide a medium coarse grade of sand free from the larger grains such as usually found in the rough sand.

A further object is to apply the abrasive with the proper admixture of water, involving the elimination of all surplus water.

Still another object of the present invention is to both grade and supply the fine sand in a novel manner by which the efficiency of the apparatus is increased, and the operating steps decreased.

The foregoing and other objects of the present invention, together with their attendant advantages will be clearly apparent as the invention becomes better understood by reference to the accompanying specification and drawings forming a part thereof. In these drawings, which are illustrative only of a preferred embodiment of my invention in which changes may be made in the construction and operation without departing from the spirit of my invention or scope of my broader claims,—

Figure 2 is an end elevation of the construction illustrated in Figure 1;

Figure 3 is a sectional elevation on the line III—III of either Figure 1 or Figure 2;

Figure 4 is a detail section illustrating one form of overflow weir which I may use; and Figure 5 is a diagrammatic view illustrating successive operations.

Figure 1:
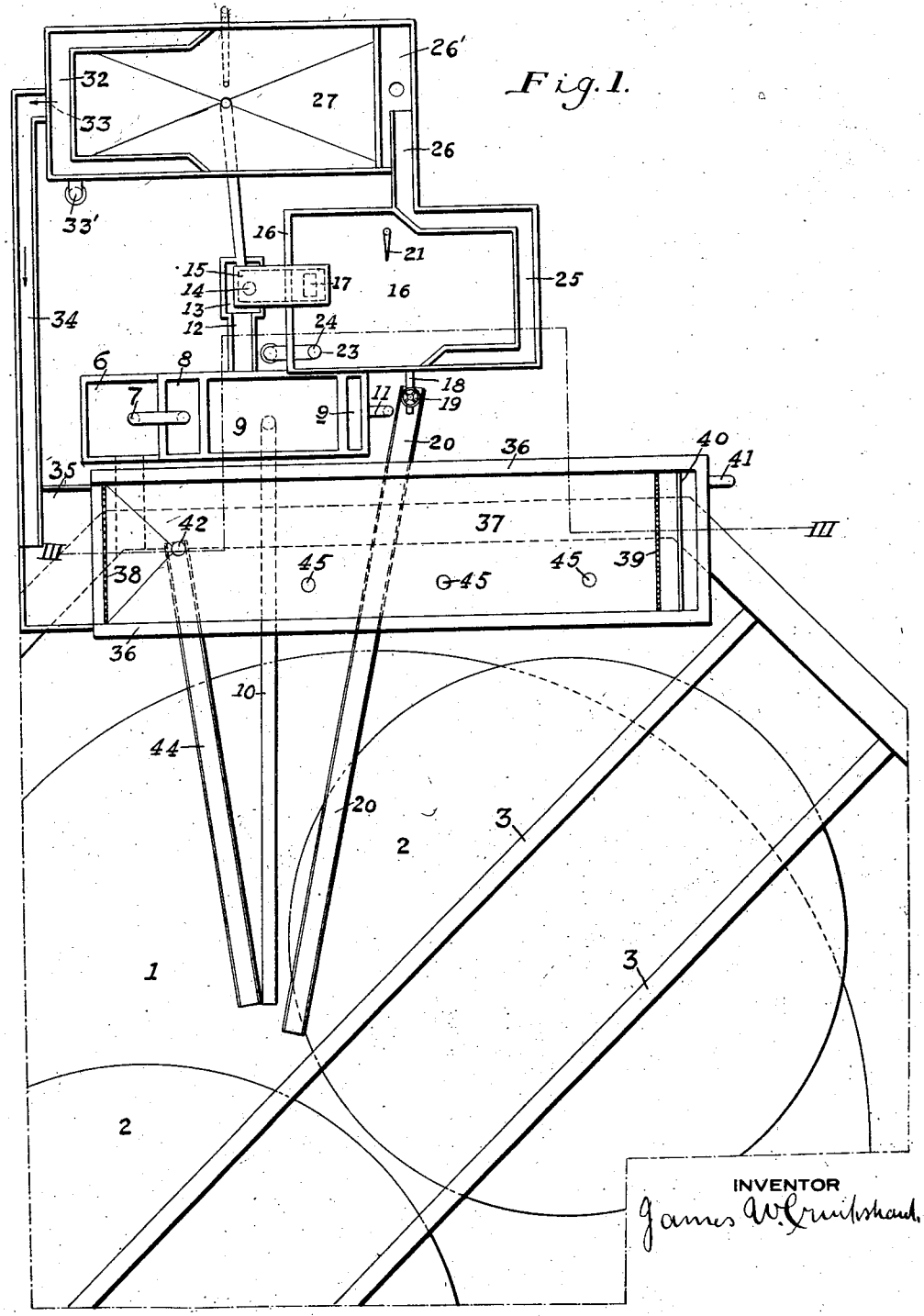
Figure 1 is a plan view showing the grading apparatus in connection with the plate glass grinding machine.

In the process of grinding glass in a plate glass grinding machine, a coarse grade of silica sand is applied directly to the glass laid on a large revolving table over which are mounted disks which are free to revolve.

The lower surfaces of these disks, adapted to contact with the glass to be ground, are covered with cast iron plates or shoes. The sand is applied with water and passes under these cast iron shoes by which it is ground down on the surface of the glass. These grains when crushed on the glass surface chip out fragments of glass and thus grind the surface. The resulting surface from grinding with coarse sand presents numerous holes between sharp serrated ridges, these holes being of an appreciable depth. In order to produce a smoother surface, finer grades of sand must be successively applied. In order to get good results a medium coarse grade of sand must be applied to reduce the depth of the holes and take off the tops of the projections or what is technically known in the art as "taking out the bottoms." After the application of this medium coarse sand, a very fine grade of sand must be applied which will further reduce the inequalities of the surface. By an examination with the microscope it will be found that what appears to the eye to be extremely fine particles of sand are, in reality, much larger in their linear dimensions than the width and depth of the irregularities on the surface of the glass. If good work is to be done in obtaining a surface that is capable of receiving a quick polish by the polishing machine, the last sand must be of an extremely fine grade. This will prepare the glass for the production of the final "smooth" in which an extremely fine grade of emery or other relatively hard abrasive is used for rounding off the tops of the serrated projections produced by the sands.

From the foregoing it will be apparent that it is necessary not only to produce a very fine grade of sand, but also that the finest grains of sand are useful and should be retained and reused on the grinding machine and not allowed to get away through the overflow of the grading apparatus. In this art the quantity of sand used for the grinding purpose is very large, and any saving effected in the use of this material is of great economical importance and highly desirable.

In sand graders of the horizontal flow type through which the abrasive from a single grinding machine is circulated, difficulty has been experienced in producing fine enough grades of sand for the finishing operation due to the comparatively limited space available at the machine. The old method of producing the fine sands was to take the overflow from all the grinding machines, after the coarser grades of sand has been applied and circulated on each machine, to the fine sand pits. These pits are of considerable length and width so that it is possible to obtain a very fine grade of sand from them.

By the present invention I am able to considerably reduce the total amount of sand required, to produce the necessary medium coarse sand, and to save and grade the fine sands whereby they may be easily and efficiently utilized.

Referring more particularly to the drawings, there is illustrated in outline the usual form of plate glass grinding table 1 above which are supported runners 2 on suitable bridge beams 3. The table 1 is surrounded by a ditch 4 of any desired construction adapted to discharge through a trough 5 into a sump 6. From this sump the sand and water are elevated by means of an air-lift pump 7 discharging into a hopper 8 communicating with the top of a pit 9 for breaking the force of the flow into the pit 9. From the pit 9 an air-lift pump 10 is adapted to raise the sand and water and deliver the same directly to the grinding table.

The pit 9 is provided with an overflow 11 leading to suitable sewer connections and with an outlet 12 discharging into a pit 13. Material is raised from the pit 13 by a suitable air-lift pump 14 discharging at its upper end into a hopper 15. The hopper 15 is supported above a medium coarse sand box 16 and is adapted to discharge its contents thereinto through a bottom opening 17. The box 16 is elevated above the grinding table 1 and is provided with an outlet 18 controlled by a valve 19 and adapted to discharge the contents of the box 16 into the trough 20 leading to the center of the grinding table 1. A water jet 21 is placed in the bottom of the box 16 and is controllable by means of a valve 22, whereby the contents of the box may be agitated at will. Communicating with the medium coarse sand box 16 above the level of the sand therein and below the water level is an outlet 23, which is normally closed by a removable plug 24.

At the end of the medium coarse sand box 16 opposite that from which the sand and water are delivered thereto is arranged a trough 25 forming a weir over which a portion of the sand and water flow. This overflow is conducted by a trough 26 to a box 26' having its bottom at the level of the water in a concentrator 27. This box is provided with a bottom opening delivering the water and sand to the concentrator at the level of the water therein. This concentrator is provided with a hopper shaped bottom 28 having a bottom outlet pipe 29 which discharges into the pit 13 which supplies the air-lift pump 14.

By reason of the construction described it will be apparent that the air-lift pump 14 delivers medium coarse and fine sand to the box 16. During the passage of the water through this box the coarser grains of sand are deposited, but as the box is relatively small, a large quantity of sand that is too coarse to make the finest grade passes therethrough into the concentrator. This sand is deposited in the concentrator, and passes therefrom through the bottom connection 29, to the pit 13, from which it is again raised by the sand pump to the box 16. This concentrator is effective for continually redelivering the coarser sand to the box 16 until there accumulates therein the desired quantity of medium coarse sand. The concentrator 27 may be provided with a water jet 30 controlled by a valve 31, whereby the sand may be loosened in case it becomes clogged therein.

At the opposite end of the concentrator from which it receives its supply of sand and water, there may be formed an overflow weir or trough 32, having an outlet 33 of relatively fixed area in the bottom thereof, delivering to a trough 34, which in turn supplies a hopper 35. It will be apparent that due to the action of the concentrator, only the finer grades of sand pass through the outlet 33 into the trough 34. The concentrator 27 may be provided with an overflow 33' adjacent one end thereof and communicating therewith below the level of the edge of the trough 32 but at a level higher than that of the outlet 33. This overflow may be connected in any desired manner to the sewer.

From the hopper 35, the finer grades of sand which are delivered thereto by the action of the concentrator, pass into a sand grader 36. This grader comprises a long trough shaped box having a V-shaped bottom 37. Adjacent the inlet end of the box there is provided a vertically extending screen 38, while at the discharge end there is provided a similarly arranged screen 39. This screen plate 38 is provided with a number of holes proportioned in such manner that the flow through the grader will be the full width of the box and of the same depth as the screen plate. This forms what is known as a "whole current" at the upper part of the box. The corresponding screen 39 may be formed with the same number of holes, whereby the current will be of the same depth and intensity as when it is first admitted through the screen plate 38. As before stated, the outlet 33 from the concentrator has a relatively fixed area, whereby the flow through the sand grader may be given a velocity sufficiently slow to insure the deposit therein of the very fine grades of sand delivered thereto by the concentrator. It will be apparent that by changing the relative size of the outlet 33, the grading of the sand in the sand grader may be correspondingly varied.

The level in the grader 36 is controlled by an overflow weir 40 from which the water may pass to the sewer through a suitable connection 41.

The usual form of grader has several separate compartments, each of which is adapted to receive sand of a different grade. Each of these compartments has to be separately washed out, thereby entailing considerably more labor. This results in decreased efficiency. This is overcome by constructing a grader as pointed out hereinafter. Adjacent the inlet end of the grader there is also provided a single outlet opening 42 adapted to be closed under normal conditions by a removable plug 43. This outlet 42 leads to a trough 44 adapted to deliver sand to the grinding table 1. At intermediate points throughout the length of the grader, there may be provided overflow sewer outlet connections 45 adapted normally to be closed by removable plugs 46. The grader herein provided is formed without any intermediate divisions or baffles between the current controlling screens. This is true for the reason that in a grader of this type the sand settles from suspension in the water carrying it in accordance with the velocity of the current through the grader and in proportion to the size of the individual grains. I have found that the sand deposited at the end of a compartment toward the inflow of the current is coarser than that at the opposite end. The larger grains will settle rapidly and the smaller grains proportionately slower, the speed of settlement, subject to modifications such as the shape and form of the grains, varies as the square of the linear dimensions of the grain so that the larger particles settle rapidly at the receiving end of the grader and the lighter particles are carried to the other end. In a grader of this type the grading will vary throughout the length thereof starting with a comparatively heavy sand at the receiving end and ending with a very fine sand adjacent the discharge end. The screens, and the proportioning of the outlet 33, equalize the flow and break up the surface current causing a uniform travel of water the full width of the box and throughout a depth determined by the height of the screens. Such a grader considerably simplifies the work of the operator as will be more fully set forth hereinafter.

The operation of a construction such as herein described is as follows:—

The water, together with the sand, passes from the grinding table to the ditch 4 and thence to the sump 6, from which it is elevated to the pit 9 by the pump 7. The coarser grade of sand descends to the bottom of this pit, while the water carrying the finer particles passes through the outlet 12 to the pit 13, from which it is in turn elevated by pump 14 to the medium coarse sand box 16. This water and the finer sand pass through the box 16 while the coarser sand is deposited on the bottom thereof. The water carrying the finer particles of sand flows out over the weir formed by the trough 25 to the concentrator. The current passing through the box 16 is somewhat rapid, and a quantity of the coarser sand will be carried over to the concentrator. This heavy sand, together with a quantity of the finer sand, settles downwardly to the bottom of the concentrator, and is redelivered to the box 16 by pipe 29 and pump 14 where the coarser sand will again have an opportunity of being retained. The flow through the pipe 29 into the pit 13 and thence by means of the pump 14 to the box 16 is in a concentrated form having a larger percentage of sand than originally contained in the water entering the medium coarse sand box. By this means a quantity of medium coarse sand will be deposited in the bottom of the box 16 ready to be delivered to the grinding machine at the desired time during the operation thereof. The remainder of the water passing into the concentrator 27 will flow over the edge of the trough 32, part of it passing through the outlet 33 to the grinding box 37 and the remainder by overflow 33' to the sewer. The part of the outflow through an opening of predetermined area from the concentrator passes to the grader through which there is produced a flow as described. As the grader has no divisions or baffles therein, but is a trough of uniform cross sectional area with a hopper bottom, the sand is deposited in a graded form, the heavier particles being found at the intake and the lighter ones at the outflow end. This is highly desirable.

The operator, in manipulating the apparatus, first shuts off the pump 10 delivering sand from the pit 9 to the table, and prepares to deliver abrasive from the medium coarse sand box 16 to the table. He therefore shuts down the pump 14 which stops the flow into this box. The plug 24 is then drawn allowing the surplus water from the upper portion of the box to flow to the sewer and leave in the box a solid deposit of sand. Water is then forced into this sand by the jet 21 controlled by the valve 22. This loosens the sand and starts it through outlet 18, valve 19 having been opened, and trough 20, to the grinding table. As soon as the sand starts, the operator follows up with a hose giving just the right consistency of water to the sand to produce the best results in grinding. The hose is used until all of the sand is washed out of the box.

The finer sand deposited in the grader 36 is then utilized. The plugs 46 are first withdrawn to permit the escape of the surplus water above the sand, then plug 43 is withdrawn allowing the sand to pass through trough 44 to the grinding machine.

This sand is very fine and almost colloidal in its nature, and requires washing from the box by means of a stream of water. As there is but a single outlet opening and only one main compartment, the work of the operator is reduced to a minimum. The operator first washes out the sand deposited around the outlet 42 with the hose after the surplus water has been removed, and then all the sand at the head end of the box following gradually with the hose to the tail end where the finest grade of sand is deposited. This gives a perfect and continuous sequence of the finer grades for the smoothing operation, and at the same time enables the quantity of water supplied with the abrasive to be accurately controlled to prevent an objectionable excess. This is very desirable in the grinding of plate glass, as it insures the gradual smoothing thereof by sand grains, gradually decreasing in size, as distinguished by the periodic or intermittent feed for predetermined intervals dependent upon the sizes of the compartments, of successive grades of sand from successive compartments.

From the foregoing it will be apparent that I have provided apparatus by means of which it is possible to supply successive grades of sand to the grinding table in an efficient manner, most of the fine sand being retained and utilized in the grinding operation. I am also enabled to control the amount of water passing with the sand to the grinding table. At the same time, the number of operations is greatly reduced. These constitute important features and advantages of the present invention.

I claim:

1. In the method of grinding plate glass, the steps consisting in feeding coarse and medium coarse sand to the glass and grinding the glass therewith, and then feeding to the glass successive portions of a single continuous sand deposit containing a perfect sequence in a common horizontal plane of sand grains graded in accordance with the linear dimensions thereof, substantially as described.

2. In the method of grinding plate glass, the steps consisting of feeding coarse and medium coarse sand to the glass, continuously regrading this sand, and then feeding to the glass successive portions of a single continuous deposit containing a perfect sequence in a common horizontal plane of sand grains graded in accordance with the linear dimensions thereof, substantially as described.

3. In the method of grinding plate glass, the steps consisting in feeding coarse and medium coarse sand to the glass, and then feeding to the glass through a single opening successive portions of a single continuous sand deposit containing a perfect sequence in a common horizontal plane of sand grains graded in accordance with the linear dimensions thereof, substantially as described.

4. In the method of grinding plate glass, the steps consisting in feeding coarse and medium coarse sand to the glass and then feeding to the glass by a stream of water whereby the consistency of the mixture may be controlled to prevent excess of water, successive portions of a single continuous deposit containing a perfect sequence in a common horizontal plane of sand grains graded in accordance with the linear dimensions thereof, substantially as described.

JAMES W. CRUIKSHANK.